US009041720B2

(12) United States Patent
Sadowski et al.

(10) Patent No.: US 9,041,720 B2
(45) Date of Patent: May 26, 2015

(54) STATIC IMAGE RETILING AND POWER MANAGEMENT METHOD AND CIRCUIT

(75) Inventors: Greg Sadowski, Cambridge, MA (US); Warren Fritz Kruger, Sunnyvale, CA (US); John Wakefield Brothers, III, Calistoga, CA (US); David I.J. Glen, Toronto (CA); Stephen David Presant, San Jose, CA (US)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 1273 days.

(21) Appl. No.: 12/642,257

(22) Filed: Dec. 18, 2009

(65) Prior Publication Data

US 2011/0148923 A1  Jun. 23, 2011

(51) Int. Cl.
  *G09G 5/39* (2006.01)
  *G06F 1/32* (2006.01)

(52) U.S. Cl.
  CPC ............ *G06F 1/3275* (2013.01); *G06F 1/3225* (2013.01); *Y02B 60/1225* (2013.01)

(58) Field of Classification Search
  None
  See application file for complete search history.

(56) References Cited

U.S. PATENT DOCUMENTS

| | | | |
|---|---|---|---|
| 5,835,435 A * | 11/1998 | Bogin et al. | 365/227 |
| 5,928,365 A | 7/1999 | Yoshida | |
| 5,961,617 A * | 10/1999 | Tsang | 710/100 |
| 6,263,448 B1 * | 7/2001 | Tsern et al. | 713/501 |
| 6,657,634 B1 * | 12/2003 | Sinclair et al. | 345/534 |
| 2003/0217246 A1 * | 11/2003 | Kubota et al. | 711/170 |
| 2004/0139359 A1 * | 7/2004 | Samson et al. | 713/320 |
| 2004/0150647 A1 * | 8/2004 | Aleksic et al. | 345/555 |
| 2005/0289377 A1 * | 12/2005 | Luong et al. | 713/322 |
| 2006/0187226 A1 * | 8/2006 | Bruno et al. | 345/534 |
| 2006/0236012 A1 | 10/2006 | Hayashi | |
| 2006/0259804 A1 * | 11/2006 | Fry | 713/324 |
| 2007/0146380 A1 * | 6/2007 | Nystad et al. | 345/582 |
| 2009/0234989 A1 | 9/2009 | Fischer | |

FOREIGN PATENT DOCUMENTS

| | | |
|---|---|---|
| CN | 1632593 A | 6/2005 |
| GB | 2426360 A | 5/2005 |

(Continued)

OTHER PUBLICATIONS

International Search Report and Written Opinion from EP Patent Office; International Application No. PCT/US2010/061039; dated Mar. 16, 2011.
Chinese Office Action issued in 201080057355.4, mailed Aug. 26, 2014, 14 pages.

(Continued)

*Primary Examiner* — Edward Martello
(74) *Attorney, Agent, or Firm* — Faegre Baker Daniels LLP (57) ABSTRACT

A circuit includes memory retiling methods which distribute image information among a plurality of memory channels producing reconfigured image information distributed among a subset of the plurality of memory channels allowing memory channels outside of the subset to be placed into a power save mode to reduce power consumption. Additional methods are disclosed for further reductions in power consumption.

22 Claims, 4 Drawing Sheets

(56) References Cited

FOREIGN PATENT DOCUMENTS

| | | |
|---|---|---|
| JP | 2004112718 A | 4/2004 |
| JP | 2004205577 A | 7/2004 |
| JP | 2005011434 A | 1/2005 |
| JP | 2006301724 A | 11/2006 |
| JP | 2009521051 A | 5/2009 |
| WO | 2007072435 A2 | 6/2007 |
| WO | 2011075649 A1 | 6/2011 |

OTHER PUBLICATIONS

EP Office Action issued in 10795904.1, mailed Feb. 20, 2014, 5 pages.

International Preliminary Report on Patentability issued in PCT/US2010/061039, completed Jun. 19, 2012, 7 pages.

Japenese Office Action issued in 2012-544896, mailed May 14, 2014, 23 pages.

* cited by examiner

STATIC IMAGE RETILING AND POWER MANAGEMENT METHOD AND CIRCUIT

FIELD

The present disclosure generally relates to memory tiling, and more particularly, to memory tiling an efficient manner to reduce power consumption.

BACKGROUND

Computer systems often have multiple memory channels that each control an associated DRAM memory bank. In order to improve memory access performance, various surfaces (e.g., frame buffer, texture, etc.) are distributed among the multiple memory channels. Distributing the surfaces among the multiple memory channels is often referred to as memory tiling. When rendering (e.g., drawing) an image, the surface is typically configured to distribute pixels within a scan line evenly across all memory channels. As such, during display scan-out, a display controller must make read requests from all memory channels to scan-out each line.

When the system is not actively used, a display displays the same image over and over again (commonly referred to as a static screen state or a user away state). When in the static screen state, the display data can be compressed to minimize the power consumption. However, even with compression, all of the channels are required and can only enter a lower power mode for a short time between requests from the display for the display data. Furthermore, modern DRAM devices, such as GDDR5 for example, require more time to transition from a low power mode—making it nearly impossible for the channels to enter low power modes between memory requests. As such, known systems can consume a considerable amount power.

One way to overcome the aforementioned drawback is to avoid using certain DRAMs (e.g., GDDR5) that require longer wake up times. When using DRAMs with shorter wake up times (e.g., DDR2/3, GDDR2/3), all memory channels can be turned on and several lines worth of image data can burst into an internal buffer of a GPU. Once the data is in the internal buffer, all the memory channels can enter a low power mode until the internal buffer has exhausted the data. This is often referred to as a display stutter mode. However, due to the longer wakeup times of modern DRAMs (e.g., GDDR5), this solution is not practical.

Accordingly, a need exists for a circuit and method to reduce power consumption of systems using memory tiling while overcoming the aforementioned disadvantages of conventional circuits and methods.

BRIEF DESCRIPTION OF THE DRAWINGS

The invention will be more readily understood in view of the following description when accompanied by the below figures, wherein like reference numerals represent like elements.

DETAILED DESCRIPTION

In one example, a circuit includes a memory circuit. The memory circuit moves image information configured to be distributed among a plurality of memory channels into reconfigured image information configured to be distributed among a portion of the plurality of memory channels. The circuit can also include a power management circuit that selectively controls one or more memory channels not included in the portion into a power save mode. In addition, the reconfigured image information can be compressed to reduce the portion of memory channels required to store the retiled static image information. A related method is also disclosed.

The circuit and method provide, among other advantages, power efficient memory tiling for static images allowing for more memory channels and/or memory banks to enter a power save mode than conventional circuits and methods. In addition, the circuit and method provide for compressing the reconfigured image information so that even more memory channels and/or memory banks can enter the power save mode. Other advantages will be recognized by those of ordinary skill in the art.

In one example, the circuit includes a static image detection circuit. The static image detection circuit detects a static image. The memory circuit moves the image information in response to the static image detection circuit detecting the static image.

In one example, the circuit includes a display controller circuit. The display controller circuit controls a display based on the reconfigured image information. The memory circuit provides tiling information to the display controller that describes how the reconfigured image information is configured.

In one example, a device includes the circuit and a display. The display displays a static image based on the reconfigured image information.

As used herein, the term "circuit" can include an electronic circuit, one or more processors (e.g., shared, dedicated, or group of processors such as but not limited to microprocessors, DSPs, or central processing units) and memory that execute one or more software or firmware programs, combinational logic circuits, an ASIC, and/or other suitable components that provide the described functionality. Unless otherwise stated, the term "power down" refers to removing (or lowering) the source power of a "circuit" and/or "device" rendering it inoperative and/or the "circuit" and/or "device" transitioning into a mode of operation that consumes less power than when in a normal mode of operation. In addition, the term "power up" refers to adding (or increasing) the source power of a "circuit" and/or "device" rendering it operative and/or the "circuit" and/or "device" transitioning into a normal mode of operation from a mode of operation that consumes less power than the normal mode of operation. Additionally, as will be appreciated by those of ordinary skill in the art, the operation, design, and organization, of a "circuit" can be described in a hardware description language such as Verilog™, VHDL, or other suitable hardware description languages.

Figure 1:
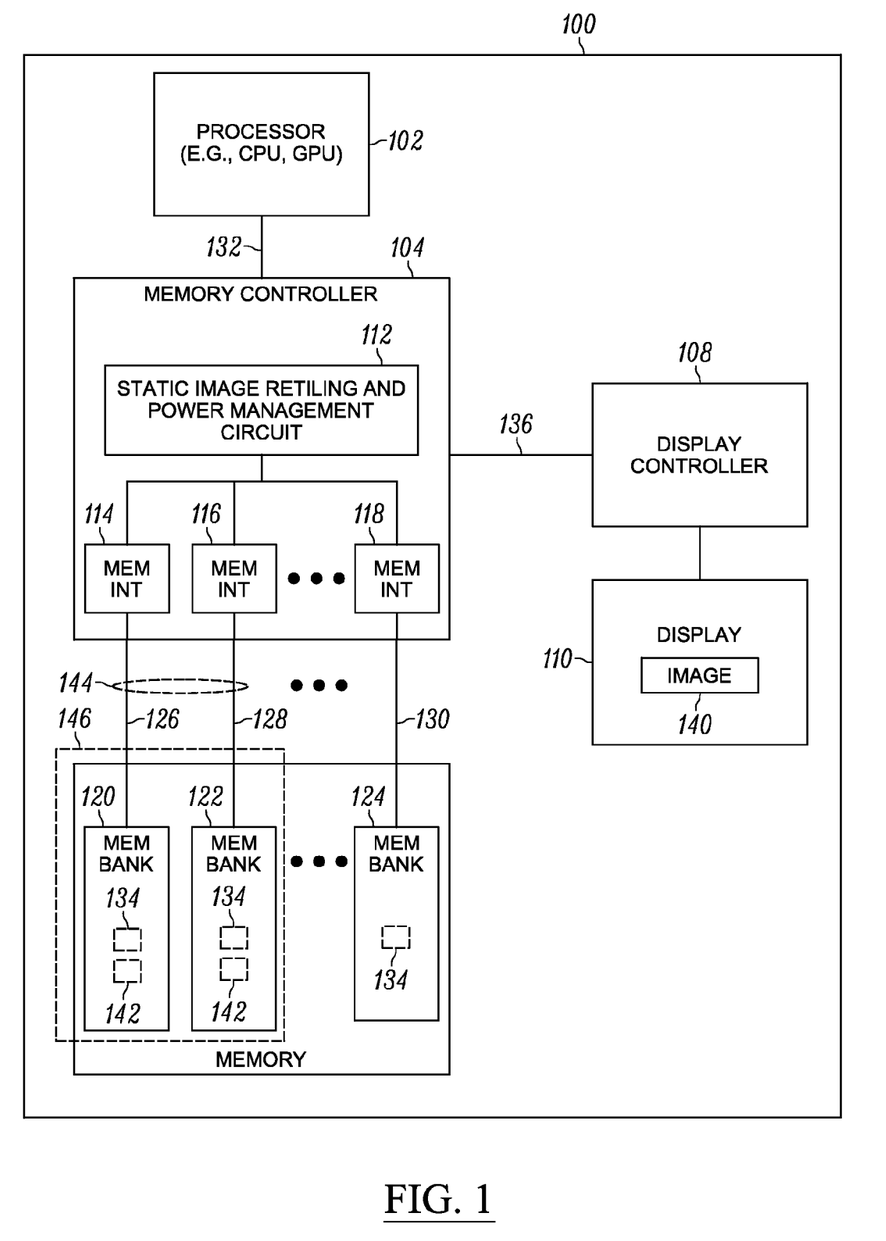
FIG. 1 is an exemplary functional block diagram of a device having a static image retiling and power management circuit.

Referring now to FIG. 1, an exemplary functional block diagram of a device 100 such as a wireless phone, a mobile and/or stationary computer, a printer, a LAN interface (wireless and/or wired), a media player, a video decoder and/or encoder, and/or any other suitable digital device is depicted. The device 100 includes at least one processor 102 (e.g., CPU or GPU), a memory controller 104, memory 106 such as DRAM memory (e.g., GDDR5), a display controller 108, and a display 110. The memory controller 104 is operatively coupled to the processor 102, the memory 106, and the display controller 108. The display 110 is operatively coupled to the display controller 108.

The memory controller 104 includes a static image retiling and power management circuit 112 and multiple memory interface circuits 114, 116, 118. Although three memory interface circuits 114, 116, 118 are depicted in this example, the memory controller 104 can include more or less memory interface circuits if desired. In addition, in some embodiments, the processor 102 can include the static image retiling and power management circuit 112 rather than the memory controller 104.

The memory 106 includes multiple memory banks 120, 122, 124. The memory banks 120, 122, 124 are capable of storing any suitable amount of information such as 4 MB or 8 MB for example. Although three memory banks 120, 122, 124 are depicted in this example, the memory 106 can include more or less memory banks if desired. As shown, each of the memory interface circuits 114, 116, 118 are operatively coupled to the memory banks 120, 122, 124 via a respective memory channel 126, 128, 130.

The processor 102 provides image information 132 based on drawing or other suitable image commands. In response to the image information 132, the memory controller 104 tiles the image information 132 into tiled image information 134 that is configured to be distributed among the memory channels 126, 128, 130 and subsequently stored among the memory banks 120, 122, 124. In one embodiment, the tiled image information 134 is evenly distributed among the memory channels 126, 128, 130 and memory tile banks 120, 122, 124.

The memory controller 104 provides the tiled image information 134 to the display controller 108 via interface 136. In response to the tiled image information 134, the display controller 108 controls the display 110 via interface 138 to display an image 140.

If the image information 132 indicates that the image 140 is a static image (e.g., the image 140 is to remain unchanged), the static image retiling and power management circuit 112 retiles (e.g., moves) the tiled image information 134 into retiled static image information 142 (e.g., reconfigured image information) configured to be distributed among a subset 144 of the memory channels 126, 128, 130 and subsequently stored among a corresponding subset 146 of the memory banks 120, 122, 124.

More specifically, the static image retiling and power management circuit 112 provides the retiled static image information 142 (e.g., one scan line at a time) to one of the memory channels 126, 128, 130 until the corresponding memory bank 120, 122, 124 no longer has capacity. Once the corresponding memory bank 120, 122, 124 no longer has capacity, the static image retiling and power management circuit 112 provides the remaining retiled static image information 142 to another one of the memory channels 126, 128, 130 until the corresponding memory bank 120, 122, 124 no longer has capacity. This process repeats until all of the retiled static image information 142 is stored in a subset 146 of the memory banks corresponding to the subset 144 of the memory channels.

Although the subset 144 of the memory channels includes memory channels 126, 128 and the subset 146 of the memory banks includes memory banks 120, 122 in this example, the subsets 144, 146 can include more or less memory channels and channel banks depending on how much capacity is required to store the retiled static image information 142.

Once all of the retiled static image information 142 is stored in the subset 146 of memory banks, the static image retiling and power management circuit 112 selectively controls memory channels outside of the subset 144 (e.g., memory channel 130) and/or memory banks outside of the subset 146 (e.g., memory bank 124) into a power save mode.

In one example, the power save mode can include powering down the memory channels outside of the subset 144 (e.g., memory channel 130) and/or powering down memory banks outside of the subset 146 (e.g., memory bank 124). In this example, memory channel interface circuits that correspond to the memory channels outside the subset 144 (e.g., memory interface circuit 118) can also be powered down.

In another example, the power save mode can include controlling the memory channels outside of the subset 144 (e.g., memory channel 130) into a self-refresh mode and/or controlling the memory banks outside of the subset 146 (e.g., memory bank 124) into a self-refresh mode.

Another exemplary power saving mode can include reducing memory clock frequency of the memory banks outside of the subset 146 (e.g., memory bank 124) and/or the memory channels outside of the subset 144 (e.g., memory channel 130).

In yet another example, voltage supplied to the memory banks outside of the subset 146 (e.g., memory bank 124) and/or the memory channels outside of the subset 144 (e.g., memory channel 130) can be reduced. In addition, one or more of the aforementioned exemplary power saving modes can be combined if desired.

The display controller 108 controls the display 110 based on the retiled static image information 142. More specifically, the memory controller 104 retrieves the retiled static image information 142 from the subset 146 of memory banks (e.g., memory banks 120, 122) via the corresponding subset 144 of the memory channels (e.g., memory channels 126, 128) and provides the retiled static image information 142 to the display controller 108. In response to the retiled static image information 142, the display controller 108 controls the display 110 to display the image 140, which is a static image in this example. In addition, in one embodiment, the static image retiling and power management circuit 112 can provide information to the display controller 108 via interface 136 that describes how the retiled static image information 142 is configured. The display controller 108 can use this information along with the retiled static image information 142 to control the display 100 to display the image 140.

If the image information 132 indicates that the image 140 is a dynamic image (e.g., the image 140 is not static), the static image retiling and power management circuit 112 selectively controls memory channels outside of the subset 144 (e.g., memory channel 130) and/or memory banks outside of the subset 146 (e.g., memory bank 124) to exit the power save mode and return to a normal operating mode.

In one example, exiting the power save mode can include powering up the memory channels outside of the subset 144 (e.g., memory channel 130) and/or powering up memory banks outside of the subset 146 (e.g., memory bank 124). In this example, memory channel interface circuits that correspond to the memory channels outside the subset 144 (e.g., memory interface circuit 118) can also be powered up.

In another example, exiting the power save mode can include controlling the memory channels outside of the subset 144 (e.g., memory channel 130) to exit the self-refresh mode and/or controlling the memory banks outside of the subset 146 (e.g., memory bank 124) exit the self-refresh mode.

In yet another, exiting the power saving mode can include increasing the memory clock frequency of the memory banks outside of the subset 146 (e.g., memory bank 124) and/or the memory channels outside of the subset 144 (e.g., memory channel 130).

In still another example, voltage supplied to the memory banks outside of the subset 146 (e.g., memory bank 124) and/or the memory channels outside of the subset 144 (e.g., memory channel 130) can be increased. In addition, one or more of the aforementioned exemplary power saving exiting modes can be combined if desired.

Once the memory channels outside of the subset 144 (e.g., memory channel 130) and/or memory banks outside of the subset 146 (e.g., memory bank 124) exit the power save mode and return to the normal operating mode, the memory controller 104 tiles the image information 132 into tiled image information 134 that is configured to be distributed evenly among the memory channels 126, 128, 130 and subsequently stored in the associated among the memory banks 120, 122, 124.

The memory controller 104 provides the tiled image information 134 to the display controller 108 via interface 136. In response to the tiled image information 134, the display controller 108 controls the display 110 via interface 138 to display an image 140.

Figure 2:
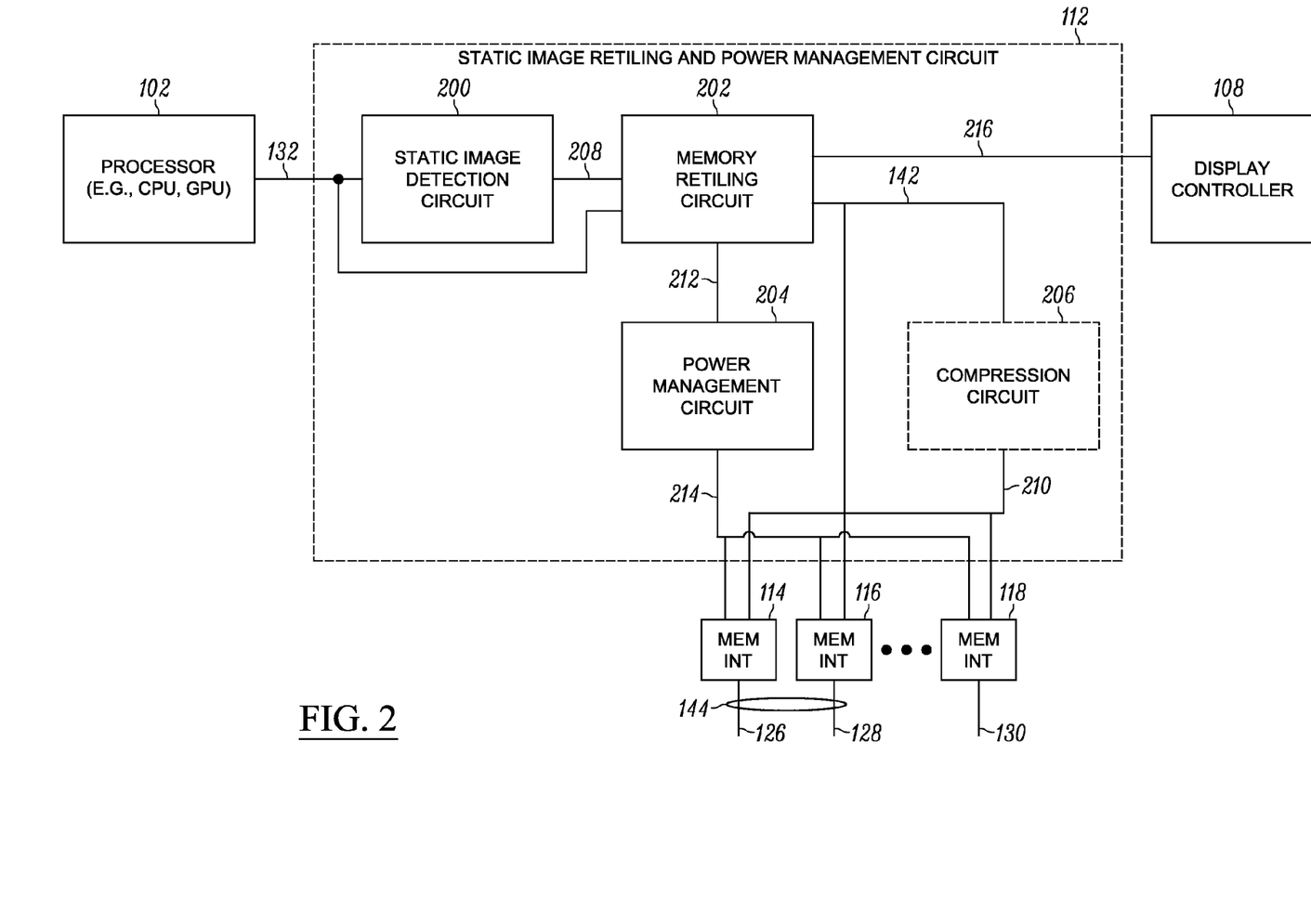
FIG. 2 is an exemplary functional block diagram of the static image retiling and power management circuit.

Referring now to FIG. 2, an exemplary functional block diagram of the static image retiling and power management circuit 112 is depicted. The static image retiling and power management circuit 112 includes a static image detection circuit 200, a memory retiling circuit 202, a power management circuit 204, and in some embodiments, a compression circuit 206. The static image detection circuit 200 provides detected static image information 208 based on the image information 132. For example, the static image detection circuit 200 provides the detected static image information 208 when the image information 132 indicates that the image 140 is to remain unchanged.

In response to the detected static image information 208, the memory retiling circuit 202 retiles the static image information 132, which is configured to be distributed substantially uniformly among the memory channels 126, 128, 130, into retiled static image information 142 configured to be distributed among the subset 144 of memory channels (e.g., memory channels 126, 128).

More specifically, the memory retiling circuit 202 provides the retiled static image information 142 (e.g., one scan line at a time) to one of the memory channels 126, 128, 130 until the corresponding memory bank 120, 122, 124 no longer has capacity. Once the corresponding memory bank 120, 122, 124 no longer has capacity, the memory retiling circuit 202 provides the remaining retiled static image information 142 to another one of the memory channels 126, 128, 130 until the corresponding memory bank 120, 122, 124 no longer has capacity. This process repeats until all of the retiled static image information 142 is stored in the subset 146 of the memory banks corresponding to the subset 144 of the memory channels.

In embodiments that include the compression circuit 206, the memory retiling circuit 202 provides the retiled static image information 142 (e.g., one scan line at a time) to the compression circuit 206. In response to the retiled static image information 142, the compression circuit 206 provides compressed retiled static image information 210 to one of the memory channels 126, 128, 130 until the corresponding memory bank 120, 122, 124 no longer has capacity. Once the corresponding memory bank 120, 122, 124 no longer has capacity, the compression circuit 206 provides the remaining compressed retiled static image information 210 to another one of the memory channels 126, 128, 130 until the corresponding memory bank 120, 122, 124 no longer has capacity. This process repeats until all of the compressed retiled static image information 210 is stored in the 146 subset of the memory banks corresponding to the subset 144 of the memory channels.

The retiled static image information 210 can be compressed in any suitable manner. For example, the compression circuit 206 can use any suitable lossy or lossless compression methodology to compress the retiled static image information 142 in order to provide the compressed static image information 210. As a result of the compression, less memory channels and memory banks are required to store the compressed static image information 210 thereby allowing for more of memory channels and/or memory banks to enter the power save mode.

Once all of the retiled image information 142 (or compressed retiled image information 210) is stored in the subset 146 of memory banks, the power management circuit 204 controls the memory channels outside of the subset 144 and/or the memory banks outside the subset 146 into the power save mode. For example, in one embodiment, the memory retiling circuit 202 provides enable power save information 212 to the power management circuit 204 when all of the retiled image information 142 (or compressed retiled image information 210) has been stored in the subset 146 of memory banks. In response to the enable power saving information 212, the power management circuit 204 provides the power save mode control information 214 to control memory channels outside of the subset 144 and/or memory banks outside the subset 146 into the power save mode.

In addition, the memory retiling circuit 202 can provide retiling configuration information 216 to the display controller 108. The retiling configuration information 216 describes how the retiled static image information 142 (or compressed retiled static image information 210) is configured. As such, the display controller 108 can then use the retiling configuration information 216 to aid in controlling the display 110 to display the image 140.

Figure 3:
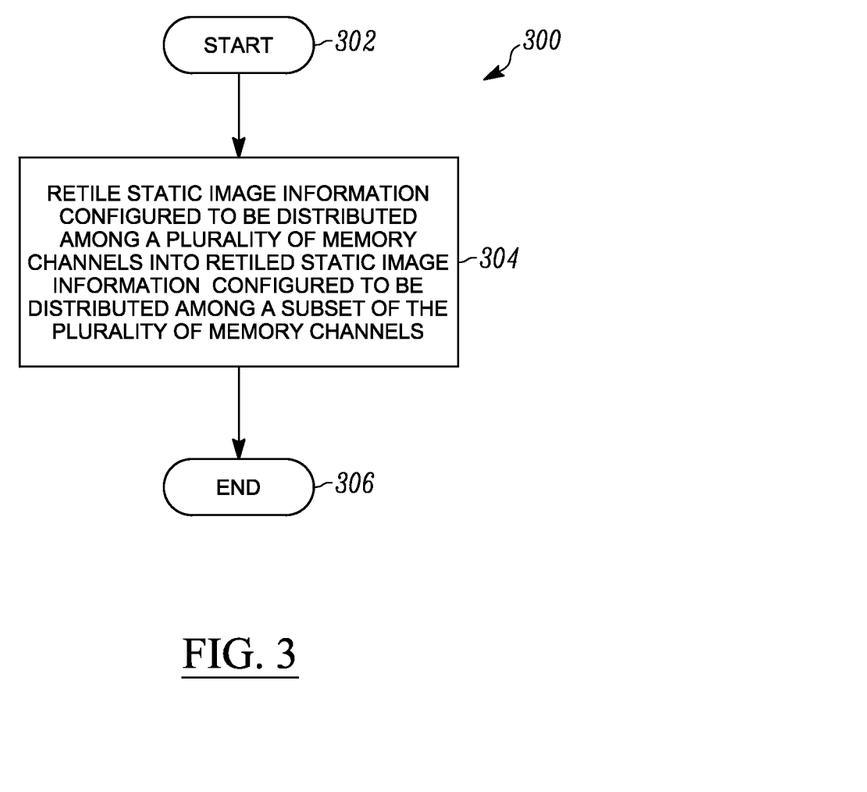
FIG. 3 is a flowchart depicting exemplary operations that can be performed by a memory retiling circuit of the static image retiling and power management circuit.

Referring now to FIG. 3, exemplary operations that can be performed by the memory retiling circuit are generally identified at 300. The process starts at 302 when the image information 132 indicates that the image 140 is to remain unchanged (e.g., a static image). At 304, the memory retiling circuit 202 retiles the static image information 132 configured to be distributed among the memory channels 126, 128, 130 into the retiled static image information 142 that is configured to be distributed among the subset 144 of the memory channels. The process ends at 306.

Figure 4:
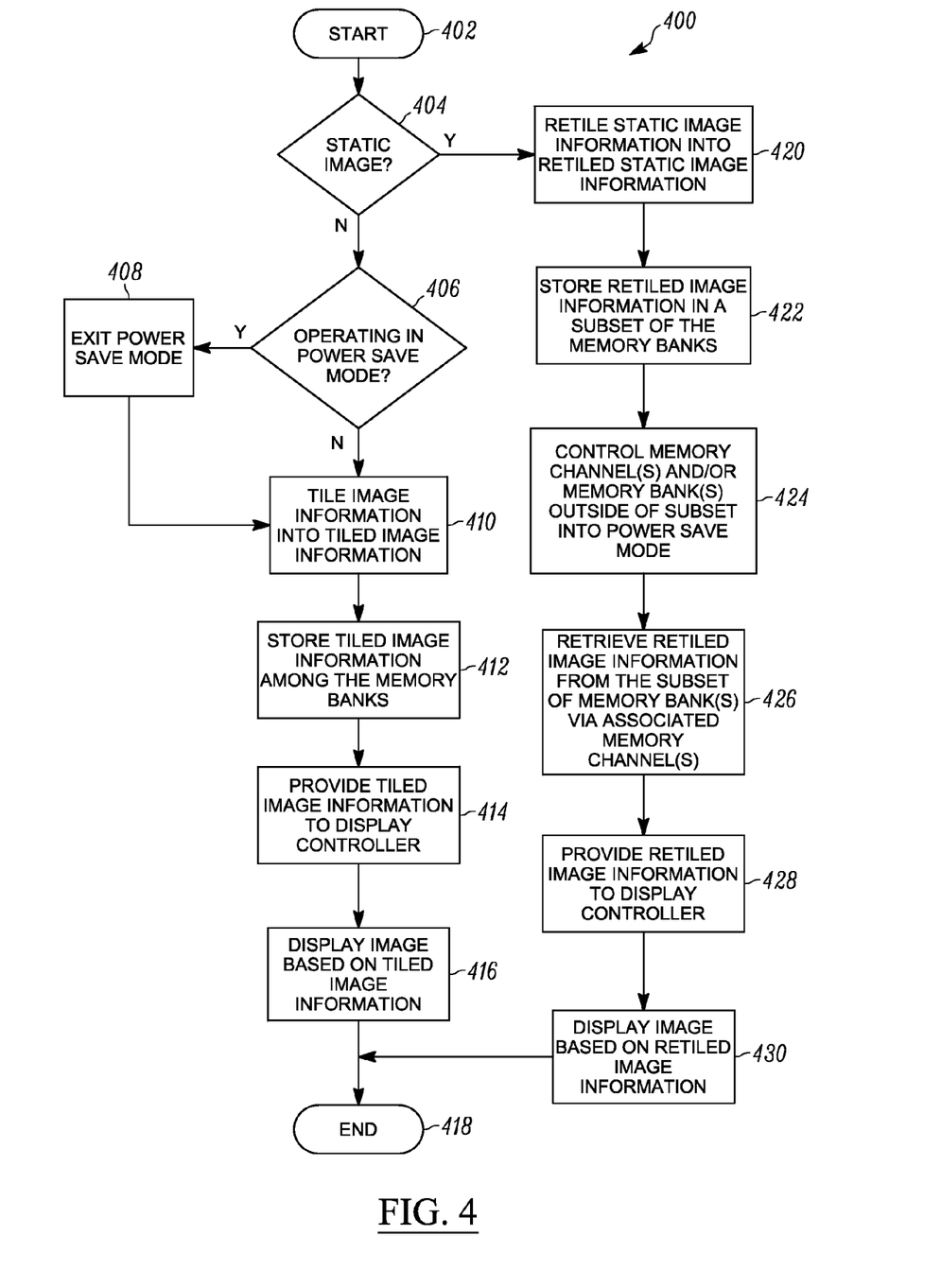
FIG. 4 is a flowchart depicting exemplary operations that can be performed by the device having the static image retiling and power management circuit.

Referring now to FIG. 4, exemplary operations that can be performed by the memory controller 104 having the static image retiling and power management circuit 112 are generally identified at 400. The process starts at 402 when the image information 132 is provided by the processor 102. At 404, the static image detection circuit 200 detects whether the image information 404 is a static image. If the image information 132 is not a static image (e.g., a dynamic image), the memory retiling circuit 202 determines whether the subset 144 of memory channels and/or the subset 146 of memory banks are operating in the power save mode at 406.

If the subset 144 of memory channels and/or the subset 146 of memory banks are operating in the power save mode, the power management circuit 202 controls the subset 144 of memory channels and/or the subset 146 of memory banks to exit the power save mode and return to a normal mode of operation at 408 and proceeds to 410. However, if the subset 144 of memory channels and/or the subset 146 of memory banks are not operating in the power save mode the process proceeds directly to 410. In addition, in some embodiments, it may be desirable remain in the power save mode while proceeding to 410. For example, if changes to the image are not intensive and/or rendering performance is not important, it may be desirable to remain in the power save mode and proceed directly to 410. As such, in some embodiments, 408 may be optional.

At 410, the memory controller 104 tiles the image information 132 into tiled image information 134 configured to be distributed evenly among all of the memory channels 126, 128, 130. At 412, the memory controller 104 stores the tiled image information 134 via the memory channels 126, 128, 130 into the memory banks 120, 122, 124.

At 414, the memory controller 104 retrieves the tiled image information 134 stored in the memory banks 120, 122, 124 and provides the tiled image information 134 to the display controller 108. At 416, the display controller 108 controls the display 110 to display the image 140 based on the tiled image information 134. The process ends at 418.

If the static image detection circuit 200 determines that the image information 132 represents a static image at 404, the memory retiling circuit 202 retiles the static image information 132, which is configured to be distributed among all of the memory channels 126, 128, 130 (or all of the memory banks 120, 122, 124), into retiled image information 142 configured to be distributed among the subset 144 of memory channels (or the subset 146 of memory banks) at 420.

At 422, the memory retiling circuit 202 stores the retiled image information 142 among the subset 146 of memory banks via the subset 144 of memory channels. Although not depicted in this example, the compression circuit 206 can compress the retiled image information 142 and then store the compressed retiled image information 210 if desired.

At 424, the power management circuit 204 controls memory channels (e.g., memory channel 130) outside the subset 144 of the memory channels and/or memory banks (e.g., memory bank 124) outside the subset 146 of memory banks into the power save mode. At 424, the memory controller 104 retrieves the retiled image information 142 (or compressed retiled image information 210) from the subset 146 of memory banks via the subset 144 of memory channels.

At 428, the memory controller provides the retiled image information 142 to the display controller 108. Although not depicted, if the compressed retiled image information 210 is retrieved, the compression circuit 206 uncompresses the compressed retiled image information 210 prior to the memory controller 104 providing the retiled image information 142. At 430, the display controller 108 controls the display 110 to display the mage 140 based on the retiled image information 142. The process ends at 418.

As noted above, among other advantages, circuit and method provide power efficient memory tiling for static images allowing for more memory channels and/or memory banks to enter a power save mode than conventional circuits and methods. In addition, the circuit and method provide for compressing the retiled static image information so that even more memory channels and/or memory banks can enter the power save mode. Other advantages will be recognized by those of ordinary skill in the art.

While this disclosure includes particular examples, it is to be understood that the disclosure is not so limited. Numerous modifications, changes, variations, substitutions, and equivalents will occur to those skilled in the art without departing from the spirit and scope of the present disclosure upon a study of the drawings, the specification, and the following claims.

What is claimed is:

1. A circuit comprising:
a memory circuit that is operative to move tiled image information representing scan lines of a static image distributed among a plurality of memory channels into reconfigured tiled image information configured to be distributed among a subset of the plurality of memory channels, such that one scan line is communicated on one memory channel of the subset of the plurality of memory channels at a time.

2. The circuit of claim 1 further comprising a power management circuit that is operative to selectively control at least one of a memory interface circuit and a memory bank corresponding to at least one of the plurality of memory channels outside of the subset into a power save mode.

3. The circuit of claim 2 wherein the power management circuit controls the at least one of the plurality of memory channels into the power save mode by enabling a memory channel self-refresh for the at least one of a memory interface circuit and a memory bank corresponding to the at least one of the plurality of memory channels.

4. The circuit of claim 2 wherein the power management circuit controls the at least one of the plurality of memory channels into the power save mode by powering down the at least one of a memory interface circuit and a memory bank corresponding to the at least one of the plurality of memory channels.

5. The circuit of claim 1 wherein the reconfigured tiled image information is compressed.

6. The circuit of claim 1 further comprising a static image detection circuit that is operative to detect a static image, wherein the memory circuit is operative to move the tiled image information in response to the static image detection circuit detecting the static image.

7. The circuit of claim 1 further comprising a display controller circuit that is operative to control a display based on the reconfigured tiled image information, wherein the memory circuit is operative to provide tiling information to the display controller that describes how the reconfigured tiled image information is configured.

8. The method of claim 1 further comprising providing tiling information to a display controller that describes how the reconfigured tiled image information is configured.

9. The circuit of claim 1, wherein the memory circuit includes memory interface circuits each operatively coupled to a memory bank within a memory via one of the plurality of memory channels.

10. A method performed by an image tiling apparatus, comprising:
moving static tiled image information representing scan lines of a static image configured to be distributed among a plurality of memory channels into reconfigured tiled image information configured to be distributed among subset of the plurality of memory channels, such that one scan line is communicated on one memory channel of the subset of the plurality of memory channels at a time.

11. The method of claim 10 further comprising selectively controlling at least one of a memory interface circuit and a memory bank corresponding to at least one of the plurality of memory channels outside of the subset into a power save mode.

12. The method of claim 11 wherein the at least one of a memory interface circuit and a memory bank corresponding to the at least one of the plurality of memory channels is in a memory channel self-refresh mode when in the power save mode.

13. The method of claim 11 the at least one of a memory interface circuit and a memory bank corresponding to the at least one of the plurality of memory channels is powered down when in the power save mode.

14. The method of claim 10 wherein the reconfigured tiled image information is compressed.

15. The method of claim 10 further comprising detecting a static image and moving the tiled image information in response to detecting the static image.

16. The method of claim 10, wherein the reconfigured tiled image information is to be distributed through one or more memory interface circuits each operatively coupled to a memory bank within a memory via one of the plurality of memory channels.

17. A device comprising:
a memory circuit that is operative to move tiled image information representing scan lines of a static image configured to be distributed among a plurality of memory channels into reconfigured tiled image information configured to be distributed among a subset of the plurality of memory channels, such that one scan line is communicated on one memory channel of the subset of the plurality of memory channels at a time; and
a display that is operative to display an image based on the reconfigured tiled image information.

18. The device of claim 17 further comprising a power management circuit that is operative to selectively control at least one of a memory interface circuit and a memory bank corresponding to at least one of the plurality of memory channels outside of the subset into a power save mode.

19. The device of claim 18 wherein the power management circuit controls the at least one of the plurality of memory channels into the power save mode by enabling a memory channel self-refresh for the at least one of a memory interface circuit and a memory bank corresponding to the at least one of the plurality of memory channels.

20. The device of claim 18 wherein the power management circuit controls the at least one of the plurality of memory channels into the power save mode by powering down the at least one of a memory interface circuit and a memory bank corresponding to the at least one of the plurality of memory channels.

21. The device of claim 17 wherein the reconfigured tiled image information is compressed.

22. The device of claim 17 further comprising a display controller circuit that is operative to control the display based on the reconfigured tiled image information, wherein the memory circuit is operative to provide tiling information to the display controller that describes how the reconfigured tiled image information is configured.

* * * * *